United States Patent [19]

Goodwin

[11] 4,043,671

[45] Aug. 23, 1977

[54] LASER SYSTEM PRESET UNIT

[75] Inventor: William L. Goodwin, Knoxville, Tenn.

[73] Assignee: The United States of America as represented by the United States Energy Research and Development Administration, Washington, D.C.

[21] Appl. No.: 704,872

[22] Filed: July 13, 1976

[51] Int. Cl.$^2$ ............................................. G01B 9/02
[52] U.S. Cl. ............................ 356/106 R; 235/92 GC
[58] Field of Search ........................... 356/106 R, 110; 235/92 EV, 92 MP, 92 GC

[56] References Cited

U.S. PATENT DOCUMENTS

| | | | |
|---|---|---|---|
| 3,638,001 | 1/1972 | Gordon | 356/106 R X |
| 3,656,853 | 4/1972 | Bagley et al. | 356/106 R |
| 3,788,746 | 1/1974 | Baldwin et al. | 356/106 R |
| 3,790,284 | 2/1974 | Baldwin | 356/106 R |

OTHER PUBLICATIONS

Rude, "L'interferometre a laser bi-frequence...", Electron. Ind. (France), No. 138, pp. 685-689, Nov. 1972.

Primary Examiner—John K. Corbin
Assistant Examiner—Matthew W. Koren
Attorney, Agent, or Firm—Dean E. Carlson; Stephen D. Hamel; David E. Breeden

[57] ABSTRACT

An electronic circuit is provided which may be used to preset a digital display unit of a Zeeman-effect layer interferometer system which derives distance measurements by comparing a reference signal to a Doppler signal generated at the output of the interferometer laser head. The circuit presets dimensional offsets in the interferometer digital display by electronically inducing a variation in either the Doppler signal or the reference signal, depending upon the direction of the offset, to achieve the desired display preset.

3 Claims, 2 Drawing Figures

LASER SYSTEM PRESET UNIT

This invention was made during the course of, or under, a contract with the United States Energy Research and Development Administration.

BACKGROUND OF THE INVENTION

This invention relates generally to laser interferometer systems and more specifically relates to a system for altering the digital distance display in a Zeeman-effect laser interferometer system.

In recent years it has become increasingly important to be able to provided dimensional inspection of machined parts to within accuracies of ±.0001 inch due to increased accuracies in tolerance requirements in precision machined parts. Normally, this dimensional inspection is done using a three-axis machine similar to the machines on which the part is cut. In order to increase the accuracy of dimensional measurements, the machines are normally equipped with laser interferometers to accurately position gauge heads and subsequently provide dimensional readouts in the gauging operation for dimensional inspection.

One particular type of interferometer system which is used in dimensional inspection is a Zeeman-type laser interferometer system. This type of interferometer system generates a distance measurement by selectively interfering two light frequencies produced by Zeeman splitting in making a comparison of a Doppler light signal reflected from a moving axis target with a reference light signal. When the target is at rest the comparison produces output pulses from photodetectors viewing the separate fringe patterns at the same frequency. When the target moves, the fringe patterns produced by the Doppler light beam will be faster or slower than the reference fringe patterns depending upon the direcion of target movement. This system is currently the most popular interferometer system available to make precision measurements. A typical interferometer of this type is the Model No. 5525B available from Hewlett-Packard, 1101 Embarcadero Road, Palo Alto, California, 94303. Details of the laser system may be had by referring to the operator's manual for the above-referenced interferometer.

One of the problems in using this type of interferometer system is that it is very difficult to initially position a tool or gauging transducer along an axis to be cut or measured relative to a machine reference datum. This problem can be eliminated by simply presetting the digital display unit interferometer to read out the desired reference distance from the datum point. Unfortunately, the electronics required to manipulate the digital display of a Zeeman-effect interferometer are very complex. This is due to the fact that any display unit for a Zeeman-effect interferometer must actually calculate each measurement, considering such variables as barometric pressure, temperature, and humidity in each calculation. Since a digital display unit of this type is so difficult to modify, a preset system is presently not available for a Zeeman-effect interferometer system. It has been the practice in the past to orient a part on a dimensional inspection machine and manually measure the distance from a reference datum, such as a bed on a dimensional inspection table of the machine, to the reference point on a particular part to be checked. This method requires that the operator subtract this distance from each dimensional measurement along that particular axis for each inspection point. This method is not only time consuming but may introduce costly errors in part qualification and inspection.

Therefore, there is a need for a system which may be readily connected to a Zeeman-effect interferometer system to conveniently preset the digital display when a gauge or tool is set at the machine datum point along an axis so that when the reference point of the part along that axis is reached by the gauge head the digital display will read zero and each measurement thereafter is the actual measurement from the part reference point along the particular axis as the part is inspected.

SUMMARY OF THE INVENTION

In view of the above need, it is an object of this invention to provide a system for presetting a Zeeman-effect interferometer system so that an operator may readily and conveniently make changes in the digital display of the laser system readout to coordinate the digital readout with the inspection tool or gauge location at the reference point on a part to be inspected or machined.

Other objects and many of the attendant advantages of the present invention will be obvious from the following detailed description taken in conjunction with the drawings.

DETAILED DESCRIPTION

Figure 1:
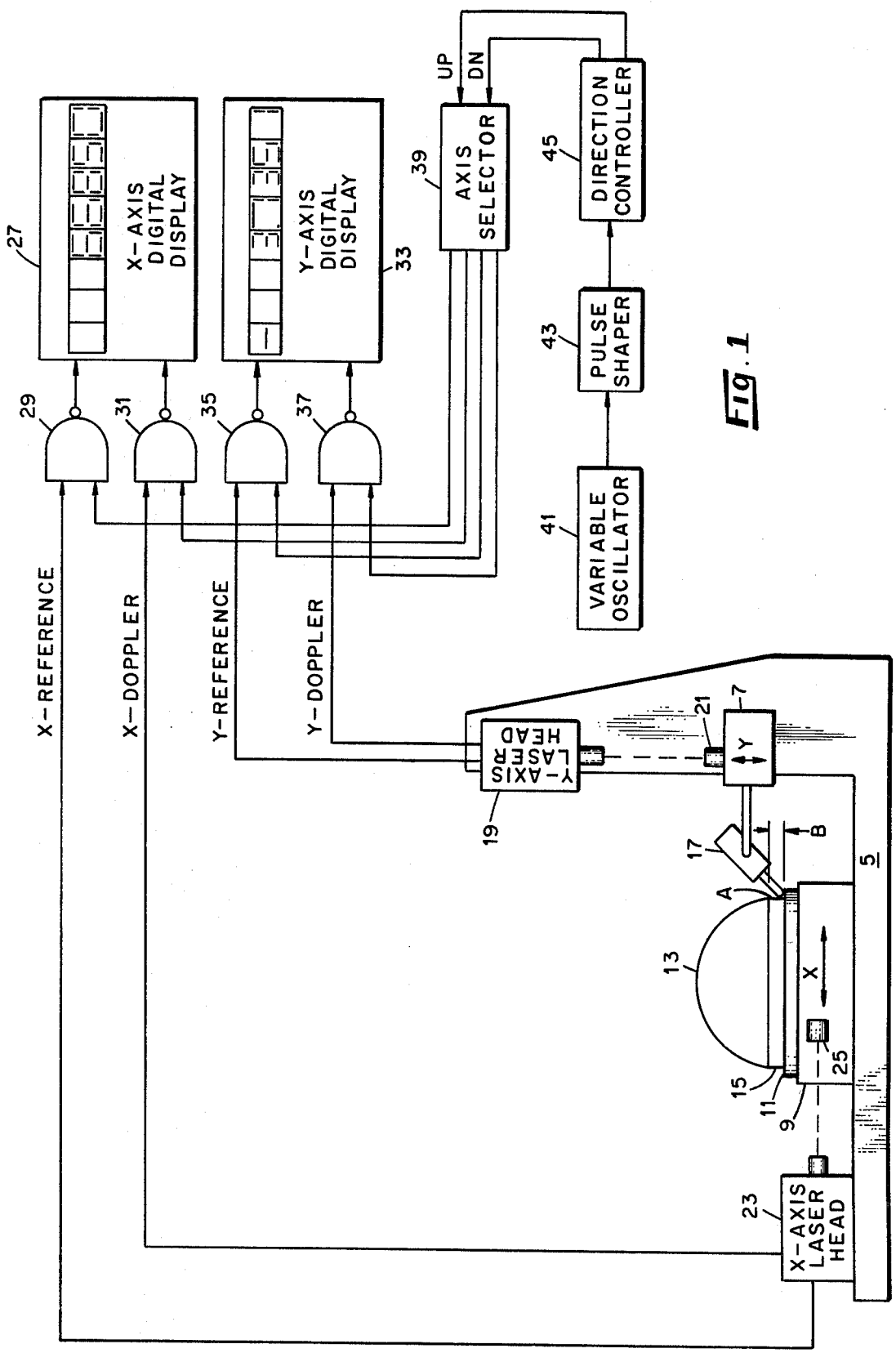
FIG. 1 is a block diagram of a Zeeman-effect laser interferometer system incorporating the laser system preset unit according to the present invention.

Although the laser system preset unit according to the present invention may be used in various precision distance measuring systems wherein the Zeeman-effect laser is incorporated for distance measurements along an axis of movement, the invention will be illustrated as applicable to a two-axis dimensional inspection machine, as shown in FIG. 1. As schematically illustrated, the two-axis inspection machine includes a base member 5 having an upright portion for carrying a slide carriage 7 which is movable along the Y axis. The bed portion of the machine is provided with an X axis carriage 9 which normally has a rotating table 11 for inspection of, for example, a hemispherical part 13 mounted on a holder 15. In the example illustrated here, the Y axis carriage 7 is adapted to carry a displacement gauge 17 which may, for example, be a linear voltage displacement transducer (LVDT).

When gauging a part, such as the hemisphere 13, it is very difficult to position the LVDT tip at a point A from which it is desired to reference the gauging dimension, that being the base of the hemisphere 13. The known position along the Y axis, for example, is the rotating table top 11 where the LVDT 17 is shown positioned in FIG. 1. The thickness of the holder 15 is known and it has been the practice in the past to subtract this thickness B from all dimensional measurements along the Y axis. Due to the accuracy required, this is a very tedious job and subject to operator error. In some laser interferometer systems the operator may simply preset the display when the LVDT 17 is in the position at the table 11 surface such that it reads a negative number and when the Y axis carriage is moved upward the 0 position will be at the A reference point of the hemisphere 13. However, as pointed out above, it is very difficult to simply preset the digital display of a Zeeman-effect interferometer as illustrated here.

The Y axis of the inspection machine is provided with a laser interferometer including the laser head 19 associated with a reflector 21 movable with the Y axis carriage 7. The X axis of the machine is also provided with a X axis laser head 23 associated with a reflector 25 movable with the Y axis carriage 9.

The laser heads 19 and 23 are of the Zeeman-effect which provide separate outputs known as a reference output and a Doppler output. When corresponding reflectors 21 and 25 are at rest, the frequency rate of the signals on the reference output and the Doppler output are exactly the same, typically 1.8 mHz. The reference and Doppler outputs are electrical signals developed by associated photodetectors positioned to view certain fringe patterns as will be briefly described hereinbelow.

The Zeeman-effect interferometer, such as the one referenced above, emloys frequency splitting of two separate light frequencies from a single laser. The frequency splitting is accomplished by the well-known spectroscopic phenomenon called Zeeman splitting. By inserting the plasma region of the laser into an axial magnetic field, a linearly polarized 6328 A light beam is converted into two circularly polarized frequencies, one above the 6328 A and the other below the 6328 A line. Adjustment of the magnetic field strength determines the magnitude of the frequency deviation and is about 900 kHz for the particular laser as referenced above.

An additional and quite useful characteristic produced by Zeeman splitting concerns the direction of rotation of the circularly polarized frequencies. Thus, the resultant laser beam is not only composed of two frequencies of light, each of which is shifted .9 mHz for a total of 1.8 mHz frequency difference, but one frequency is lefthand rotation and the other is righthand rotation. When passed through a "quarter wave" plate, the resultant beam is composed of the original two frequencies, but they will be linearly polarized and mutually perpendicular.

The reference signal photodetector is impressed with the fringes formed by interfering equal portions of both frequencies. The result is a sinusoidal electrical output at a rate of 1.8 mHz. The Doppler signal photodetector is impressed with the fringes formed by interfering one of the laser frequencies ($F_1$) which is split from the combined laser beam with the other frequency ($F_2$) which is reflected from the movable reflector for the particular axis along which the measurement is made. While the movable reflector is stationary, the resultant electrical output is identical to that of the reference photodetector. However, if the reflector is moved away from the interferometer the Doppler signal becomes the difference between $F_1$ and the resultant return beam frequency $F_2 \pm \Delta F$. This difference frequency is slightly higher or lower than 1.8 mHz, depending upon the reflector direction of movement, and a function of reflector velocity.

Both the reference and Doppler sinusoidal signals are converted before exiting the laser head to very narrow negative going pulses to produce signals acceptable to the logic system used with the Zeeman-effect interferometer to display the moved distance of the particular reflector.

Both the reference and Doppler logic signals are counted by separate counters in the particular digital display unit. When starting from a reset condition and with no reflector movement, both the reference and Doppler counters begin to count the 1.8 mHz signals. If at any time a sample is taken from both counters and compared, a difference of 0 will result. When a reflector move occurs, a frequency shift occurs during the move resulting in a different count between the reference and Doppler counters. That difference represents the number of cycles of phase shift (or number of quarter wave lengths) traversed by the reflector.

At an appropriate time, the program will examine the counters, take the difference, store it, and release the counters. This is accomplished through a clutching operation with no loss of information. The difference number is then multiplied by a units conversion number (6230231 for inches display), and multiplied by the correction factor which may be preset for the particular environmental conditions, and loaded into the display. This process is repeated automatically at a 200 Hz rate. This corresponds to changes of about 0.0005 inch per step for reflector velocity of 6 inches per minute or 0.005 inch per step at 60 inches per minute. Thus, it will be seen that it would be very difficult to change the display of the Zeeman-effect interferometer to properly obtain the exact part reference position A, as shown in FIG. 1. Further details of the operation of the Zeeman-effect interferometer system may be had by referring to the operator's manual for the particular interferometer referenced above.

The present invention which will now be described solves the difficult problem of presetting the digital display of a Zeeman-effect interferometer which does not involve the complications as described above, but simply manipulates the reference or Doppler input to the display unit to provide the appropriate displacement preset on a digital display.

Returning now to FIG. 1, it will be seen that the X axis reference nd the X axis Doppler outputs of laser head 23 are connected to the input of the X axis digital display unit 27 through respective NAND gates 29 and 31. Correspondingly, the Y axis reference and the Y axis Doppler signals are connected to the Y axis digital display 33 through respective NAND gates 35 and 37. The displays 27 and 33 recognize count pulses on either input by a negative going logic level signal. Thus, enabling inputs to each of the NAND gates 29 through 37 are connected to control outputs from an axis selector switch 39. Pulses necessary to control the NAND gates for changing the particular digital displays selected by the axis selector 39 is provided from a variable oscillator 41. The output of the oscillator 41 is connected to the input of pulse shaper 43 which generates a negative going logic signal for each cycle of the signal from the oscillator 41. The output signal from the pulse shaper 43 is timed, as will be described hereinbelow, to eliminate one reference or Doppler signal from being applied to the selected digital display for each pulse from the pulse shaper 43. the output from pulse shaper 43 is connected to the input of a direction controller 45 which applies the pulses to either the up input to increase the digital display or the down input to decrease the display.

Figure 2:
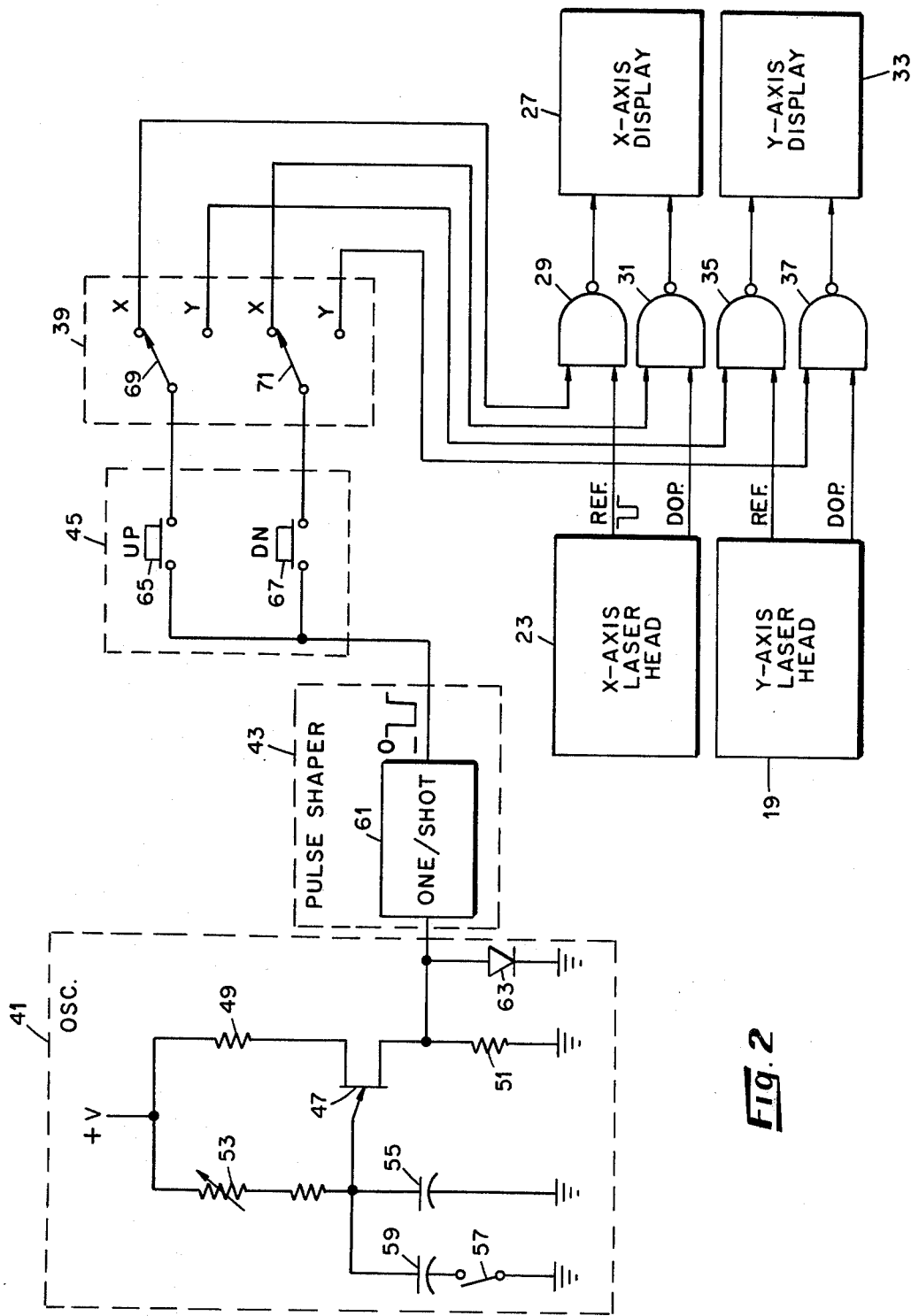
FIG. 2 is a schematic diagram of the laser system preset unit as shown in block form in FIG. 1.

Referring now to FIG. 2 wherein like parts are identified by the same reference numeral as used in FIG. 1, the digital display preset circuit is shown in detailed schematic form. The variable oscillator 41, pulse shaper 43, direction controller 45, and axis selector 39 are shown in detail and singled out by means of dashed lined enclosures. The oscillator 41 is of conventional design wherein a unijunction transistor 47 is connected at its base two electrode through resistor 49 to a positive voltage supply and at its base one electrode through resistor 51 to ground. The emitter of transistor 47 is connected through a variable resistor 53 to the positive voltage supply. To complete the oscillator circuit the emitter of transistor 47 is connected through a capacitor 55 to ground. The oscillator may be provided with a range selector switch 57 which is connected in series with a capacitor 59 and the series circuit is connected between the emitter of transistor 47 and ground. By closing the range selector switch 57 the response time of the oscillator is lengthened, thereby providing a means for fine adjustment of the preset unit.

The pulse shaper 43 may be a conventional one-shot 61 which has its input connected to the base one electrode of transistor 47. In this arrangement, a diode 63 is connected between the base one electrode of transistor 47 and ground potential to protect the one-shot 61 from overloads. Thus, each cycle of the signal from the oscillator 41 triggers one-shot 61 which provides a negative going logic pulse at its output for each oscillator cycle. The output of one-shot 61 is connected to the direction control 45 which consists of separate switches 65 and 67 having one side commonly connected to the output of one-hot 61 for "up" counting "down" counting the digital display, respectively. The other terminal of switches 65 and 67 are connected respectively to the common terminal of separate selector switches 69 and 71 which comprise the axis selector 39. Switches 69 and 71 are gauged together and have a selectable terminal for each of the axes of the machine for which the circuit is being used. In this case only a two-axis machine is illustrated, therefore selector switches 69 and 71 have two positions. When switches 69 and 71 are in the position shown, the X axis is selected and switch 69 is connected to the enabling input of NAND gate 29 for selecting the "up" count direction of the X axis display. Further, in this position the switch 71 X terminal is connected to the enabling input of NAND gate 31 which allows pulses to count the display down when the down direction controller switch 67 is depressed. Alternatively, when setting the display for the Y axis, switches 69 and 71 are switched to the Y position and similarly the Y terminal of switch 69 is connected to the enabling input of NAND gate 35 while the Y terminal of switch 71 is connected to the enabling input of NAND gate 37 for controlling "up" and "down" counting, respectively, of the Y axis display 33.

In operation, depending upon the magnitude which a particular display is to be changed, the oscillator frequency is set by the operator by positioning switch 57 to either a coarse or fine adjustment, open or closed position, respectively. The oscillator frequency is typically 5 kHz with only capacitor 55 connected in the circuit and the variable resistor 53 set at a minimum position. This setting provides a maximum rate of change of the particular display selected. Now assume for illustration purposes that the Y axis display is to be preset so that the A position, as shown in FIG. 1, will be a 0 reading on the display when the Y axis carriage 7 is positioned so that the displacement gauge 17 is positioned at the A level. First, the Y axis carriage is moved until the displacement transducer 17 contacts the table 11, as shown. Knowing the distance B, this value is to be set in the Y axis display as a negative value so that when the Y carriage 7 is moved upward to the A position, the 0 reading will be displayed on the Y axis display 33 when the transducer 17 reaches the A position along the Y axis. Assuming that the distance B is 3.7351 inches, the Y axis digital display is set to 0 by a conventional reset switch normally supplied with a laser interferometer display unit and since the value to be set is in the negative direction the operator depresses the "down" switch 67 in the controller 45. Assuming that the axis selector switch 39 is set for adjusting the Y axis display, the display will begin to count down. Thus, the pulses from the one-shot 61 are supplied through the switch 67 and switch 71 to the enabling input of NAND gate 37. Since the oscillator is running at a rate of 5 kHz and the one-shot 61 is producing an output pulse at the same rate and the Doppler frequency rate from the Y axis laser head 19 is 1.8 mHz, the Y axis display will be counted down at a rate of approximately 2.75 inches per minute. The width of the pulse from one-shot 61 is selected so that each time the one-shot is triggered, NAND gate 37 is disabled for a period to exclude one Doppler pulse from the input of the Y axis display unit 33. Thus, the rate at which the Doppler pulses are blocked, one at a time, controls the rate at which the Y axis display is changed. As the value in the y axis display approaches the setting desired by the operator, the range selector switch 57, in the oscillator circuit, is closed to obtain fine control, that is, reducing the rate of pulses from one-shot 61. Further adjustment may be made by increasing the resistance of the variable resistor 53. The operator then again presses the down button 67 until the display changes to the B value (-3.7351) as illustrated in FIG. 1. Thus, when the Y axis carriage is moved upward to the gauging position A along the Y axis, the digital display will read 0, and all further measurements will be referenced from point A making it unnecessary for the operator to subtract value B from the readings taken from that point on as has been the practice in the past.

If the Y axis display is to be changed in the "up" count direction the same procedure is followed except the operator presses the "up" directional control switch 65 which applies pulses through switch 69 to the NAND gate 35. This eliminates reference pulses from the input to the Y axis display and the Y axis display will be counted in an upward direction until a specific value is obtained.

In a similar manner, the X axis display 27 may be manipulated to provide a desired preset value according to a known distance along the X axis to a reference point on the part 13, such as the center axis of the hemispherical part 13.

Thus, it will be seen that a very simple and inexpensive circuit has been provided for convenient manipulation of the displays for Zeeman-effect type interferometers for presetting dimensional measurements along a particular axis in a displacement measurement system. Although the invention has been illustrated by way of specific example in connection with an inspection machine having two axes, it will be obvious to those skilled in the art that various modifications and changes may be made in the circuit without departing from the spirit and scope of the invention as set forth in the following claims. For example, the circuit may be adapted by adding a third position to the axis selector switch 39 to control the preset in a three-axis machine from the same preset unit. This requires an additional pair of NAND gates between the reference and Doppler outputs, respectively, of a third axis laser head and the third axis display unit.

What is claimed is:

1. In a Zeeman-effect laser interferometer system for measuring displacement of an object along an axis including a laser head having a reference signal output for producing pulses at a fixed rate and a Doppler signal output for producing pulses at a rate greater than the rate of said fixed rate pulses for displacement in a forward direction and less than the rate of said fixed rate pulses for displacement in a reverse direction and a digital display unit for detecting differences in the Doppler signal rate relative to the pulse rate of said reference signal for calculating and displaying the displacement of said object along said axis from a reference point, a display preset circuit, comprising:

a selectable frequency oscillator;

pulse-shaping means connected to the output of said oscillator for generating a fixed period pulse at an output thereof at a repetition rate equal to the frequency of said oscillator, said fixed period being substantially equal to the period of said reference signal and said Doppler signal;

a first gating means having an enabling input for coupling the reference signal output of said laser head to the reference signal input of said display unit;

a second gating means having enabling input for coupling the Doppler signal output of said laser head to the Doppler signal input of said display unit; and switching means for selectively applying said fixed period pulses to either the enabling input of said first gating means or the enabling input of said second gating means so that the selected gate is disabled for at least the period of one reference or Doppler pulse for each fixed period pulse until the valve to be preset into the display unit is obtained.

2. The combination as set forth in claim 1 wherein said pulse-shaping means is a one-shot multivibrator having an input connected to the output of said oscillator and an output connected to the input of said switching means.

3. The combination as set forth in claim 2 wherein said variable frequency oscillator further includes a range selector means for changing the frequency of said oscillator according to the desired rate that said display unit is changed to obtain said preset value.

* * * * *